Figure 1:
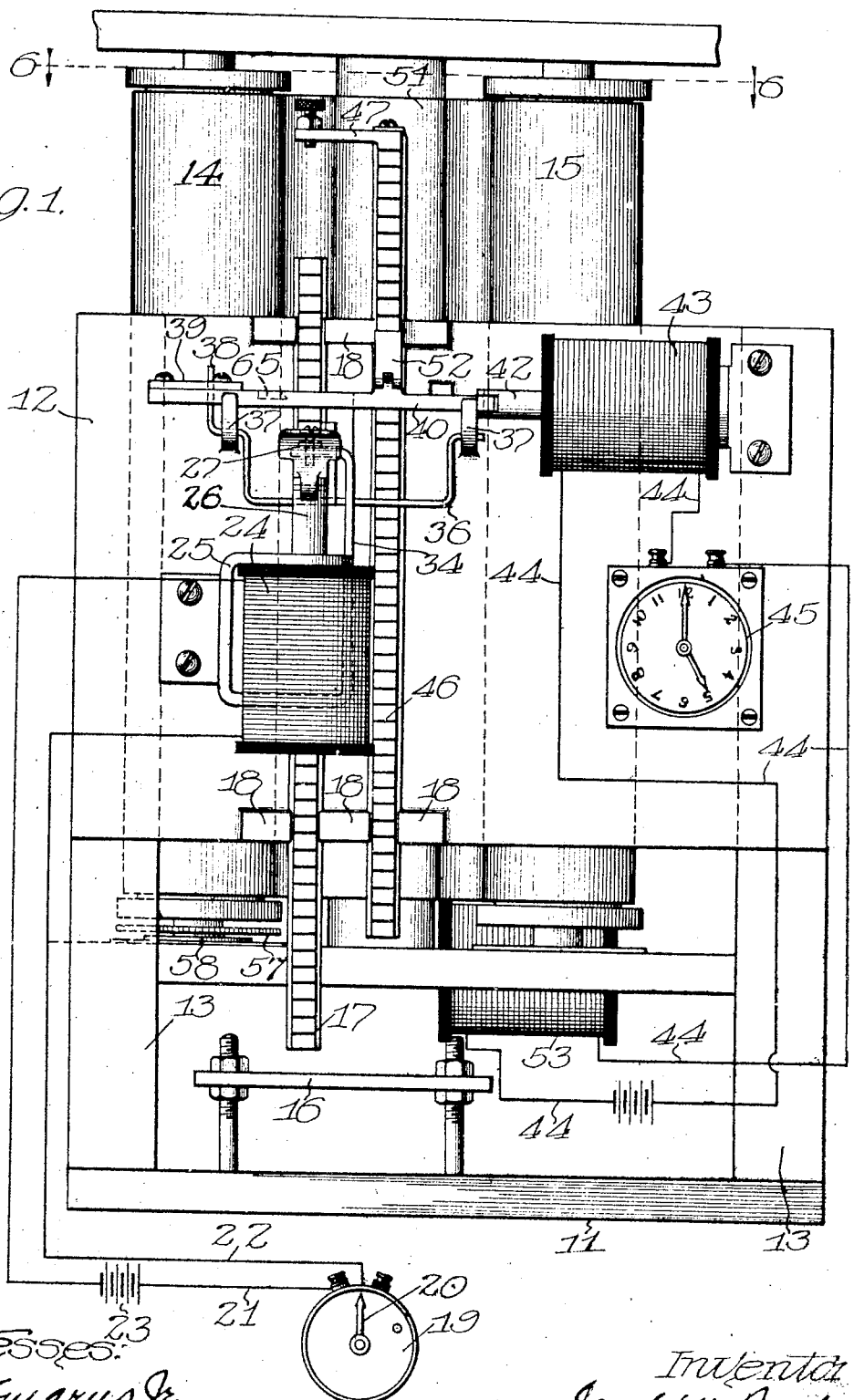

J. W. BARD.
INTERVAL DEMAND INDICATING MECHANISM.
APPLICATION FILED DEC. 18, 1911.

1,133,455.

Patented Mar. 30, 1915.
8 SHEETS—SHEET 1.

J. W. BARD.
INTERVAL DEMAND INDICATING MECHANISM.
APPLICATION FILED DEC. 18, 1911.

1,133,455.

Patented Mar. 30, 1915.
8 SHEETS—SHEET 3.

Witnesses:

Inventor
Jacob W. Bard

J. W. BARD.
INTERVAL DEMAND INDICATING MECHANISM.
APPLICATION FILED DEC. 18, 1911.

1,133,455.

Patented Mar. 30, 1915.
8 SHEETS—SHEET 6.

Witnesses:
Inventor
Jacob W. Bard

J. W. BARD.
INTERVAL DEMAND INDICATING MECHANISM.
APPLICATION FILED DEC. 18, 1911.
1,133,455.    Patented Mar. 30, 1915.
8 SHEETS—SHEET 7.
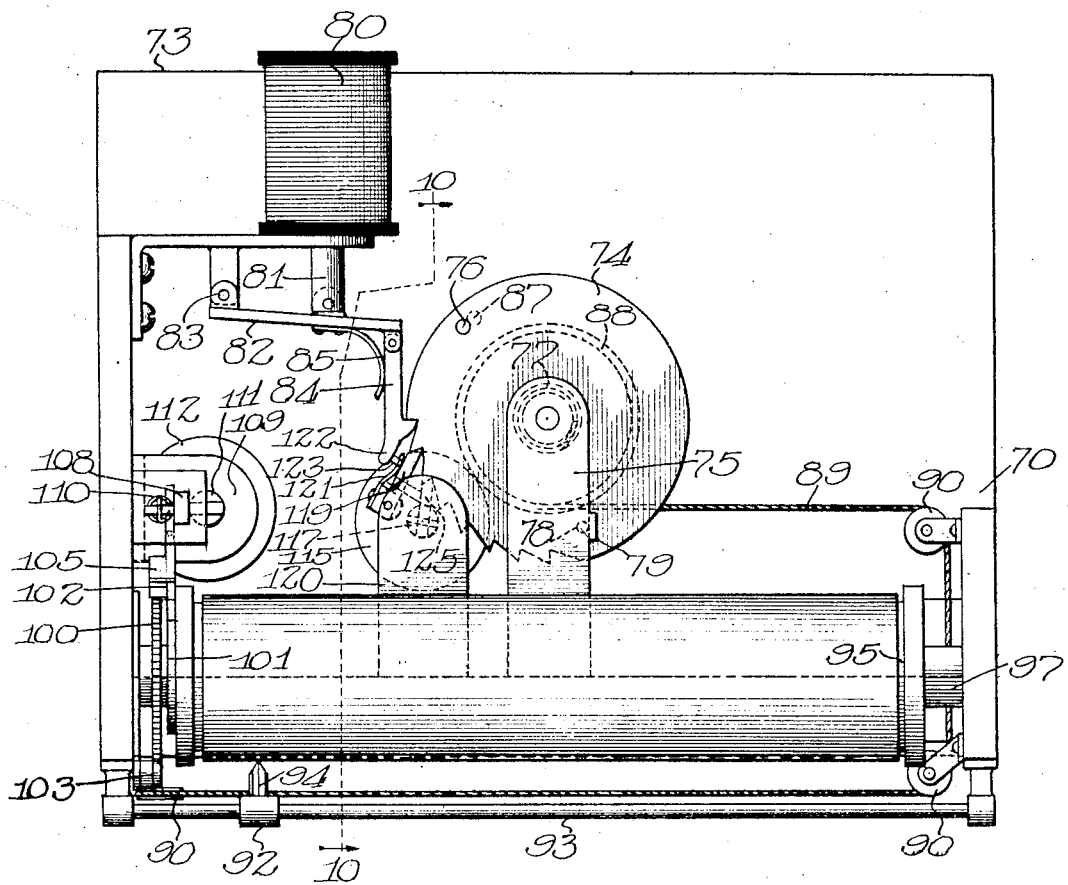
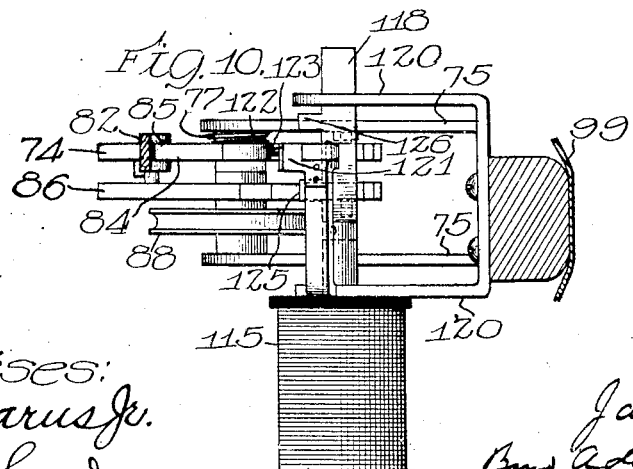
Witnesses:
Inventor
Jacob W. Bard J. W. BARD.
INTERVAL DEMAND INDICATING MECHANISM.
APPLICATION FILED DEC. 18, 1911.

1,133,455.

Patented Mar. 30, 1915.
8 SHEETS—SHEET 8.

UNITED STATES PATENT OFFICE.

JACOB W. BARD, OF PEORIA, ILLINOIS, ASSIGNOR TO SANGAMO ELECTRIC COMPANY, OF SPRINGFIELD, ILLINOIS, A CORPORATION OF ILLINOIS.

INTERVAL-DEMAND INDICATING MECHANISM.

1,133,455.  Specification of Letters Patent.  Patented Mar. 30, 1915.

Application filed December 18, 1911. Serial No. 666,511.

*To all whom it may concern:*

Be it known that I, JACOB W. BARD, a citizen of the United States, residing at Peoria, in the county of Peoria and State of Illinois, have invented certain new and useful Improvements in Interval-Demand Indicating Mechanisms, of which the following is a specification, reference being had to the accompanying drawings.

My invention relates to interval demand indicating mechanisms, and its object is to provide an instrument which will record, directly upon a chart, the successive average demand of electric current used during any desired equal intervals of time, and particularly the successive average demand for electricity used during any desired equal intervals of time when electricity is consumed, particularly for power purposes.

In selling electrical energy, particularly for power purposes, it has become necessary, during recent years, that the central station should know not only the total amount of current consumed by a consumer during any period, which is readily ascertained from any of the usual types of watt-hour meters, but also that a record should be obtained of the maximum amount of current used at any time and for how long a period such a maximum demand has continued. The ordinary graphic or recording meter does not give the desired information, as such instrument is designed to record continuously the varying values of pressure current or power from moment to moment. Therefore, on many loads, such as in case of a shop with rapidly changing demand on machine tools, etc., or of a street railway system, the record obtained from a graphic meter is frequently a succession of sharp peaks made by movements of the pen back and forth across the paper, making it difficult to ascertain from such record the actual average value of current or power demand during successive brief intervals of time. This is not so important to the central station if a customer uses a load which may occasionally have a demand considerably in excess of the normal for a very brief interval, say, of two or three seconds, but it is very important if the customer, say, uses the energy so as to run it up to a high value for a considerable period of time, say five or ten minutes, even though the load drops down considerably and continues at the low value for a long time before another heavy demand comes on. There is, therefore, great need of a recording instrument which will show on a chart, not the quickly varying values of current or of power, but the average demand of a given load during successive brief intervals of, say, five, ten, or thirty minutes duration, according to the nature of the load and the central station conditions. With such a record as this the central station manager is in condition to deal intelligently with a customer, basing the charge for current not only on the total number of kilo-watt-hours used in a given period but also upon the ratio of maximum demand during brief intervals to the average demand of the customer. A customer who uses current at a fair average rate day in and day out and does not have any excessive demands during such intervals is one to whom current can be sold at a lower rate than a similar customer who is using the same total amount of current but who frequently has excessive demands, even though for only five, ten or fifteen minutes at a time. To meet these requirements, various atempts have been made to develop so-called maximum demand or interval demand meters, these all being recording devices of one kind or another, but inasmuch as the record to be obtained should be based upon the energy consumption during successive intervals and not upon the fluctuating power demand from moment to moment, instruments of this type have been usually developed operating from an integrating electrical meter, or, as such meters are now known, a "watt-hour" meter. For instance, in one type of instrument which has been used, the watt-hour meter closes a circuit by means of a contact in its recording train at regular intervals of a certain unit number of kilo-watt-hours recorded. The closing of this circuit, operating through an electro magnet, causes a number to be printed upon a paper tape or chart, giving the total kilo-watt-hours registered by the watt-hour meter at the time of closing the contact. This printing of the kilo-watt-hours is done at successive intervals of time, determined by a master-clock or other suitable means. By taking the successive readings on the tape from each preceding reading, the kilo-watt-hours consumed in each interval of time will be obtained. With this type of instrument, however, it is necessary to make subtractions of the successive readings on the tape and plot the values upon a chart.

It is the object of my invention to produce an instrument which will record directly upon the chart the successive average demand during desired equal intervals of time, and I therefore term my device an "interval demand indicating instrument or meter."

Figure 2:
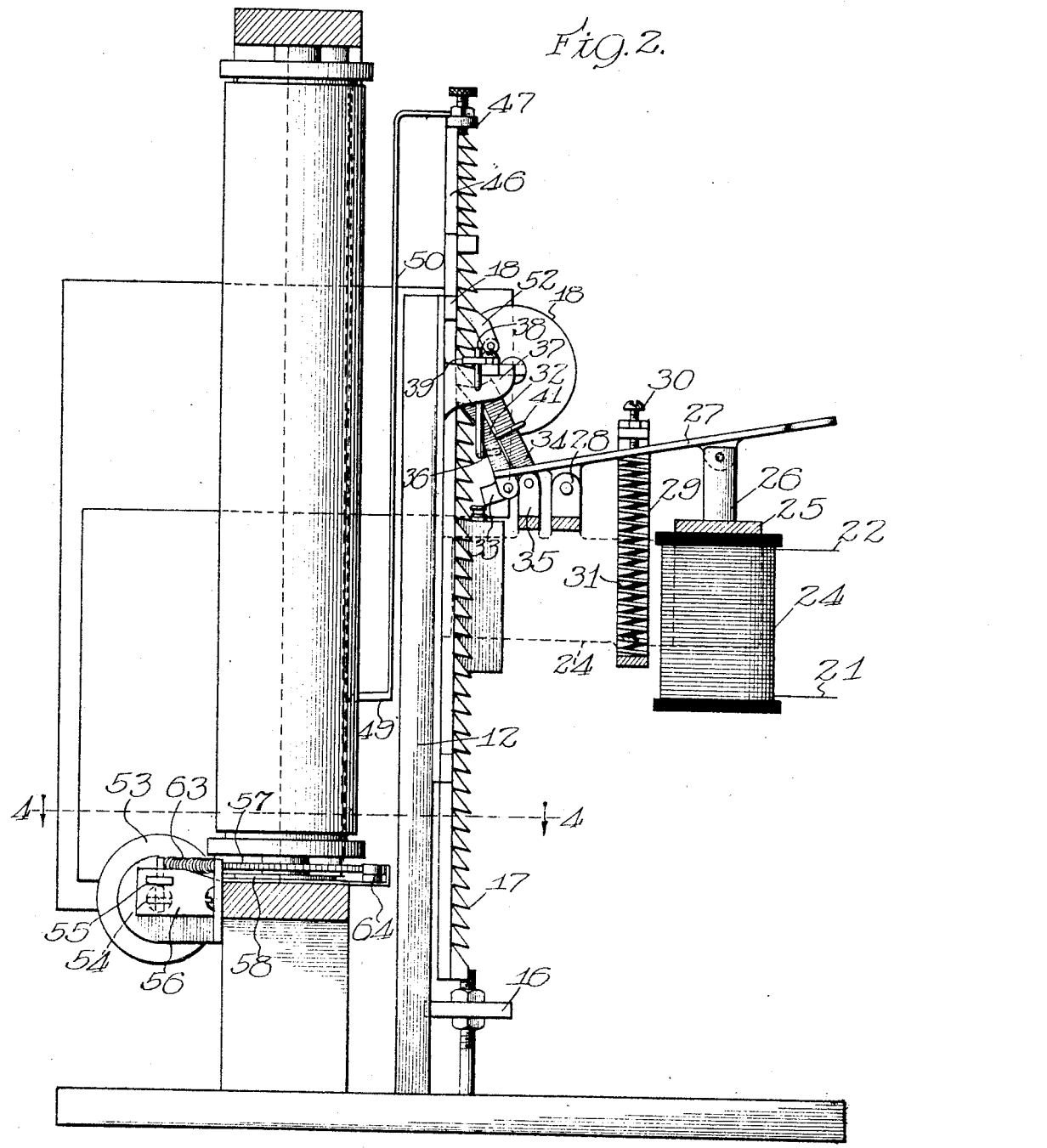
Figure 3:
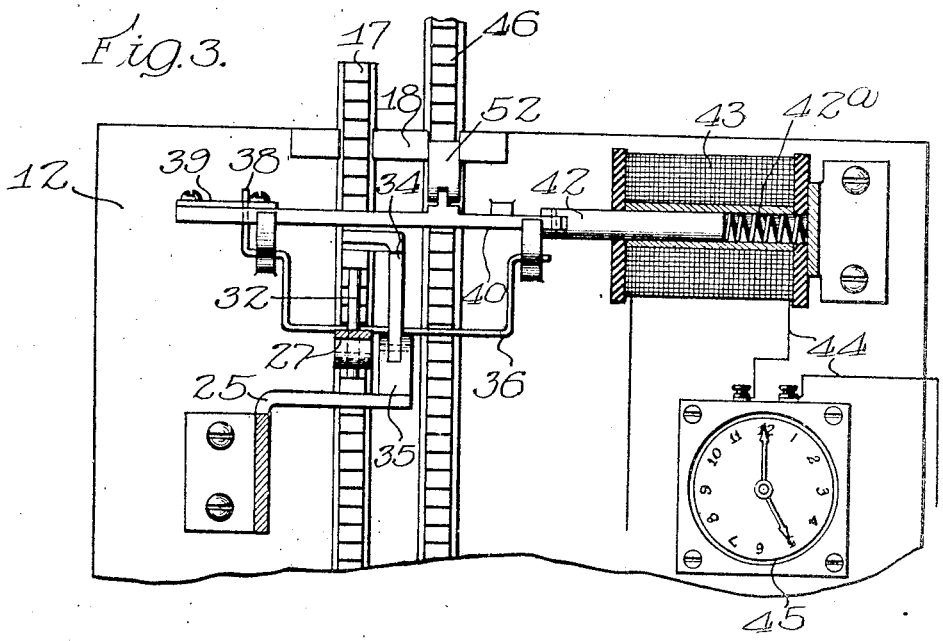
Figure 4:
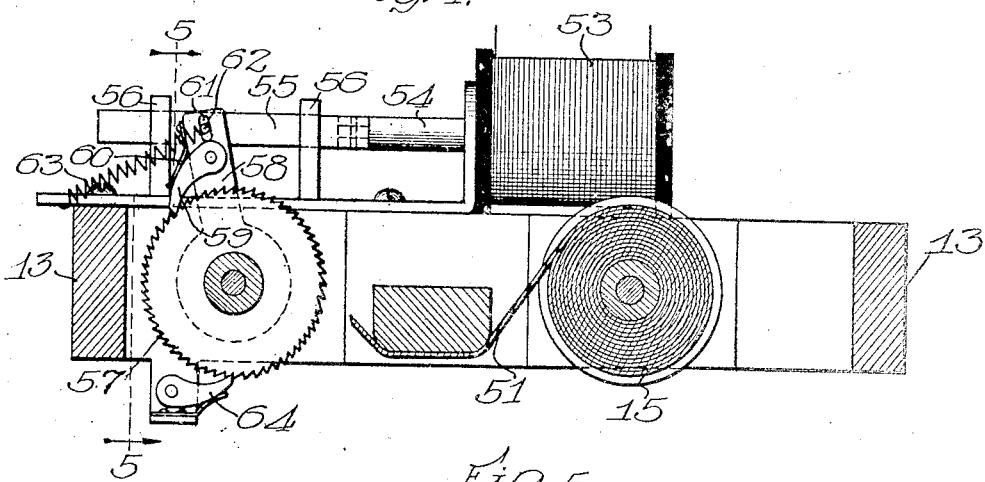
Figure 5:
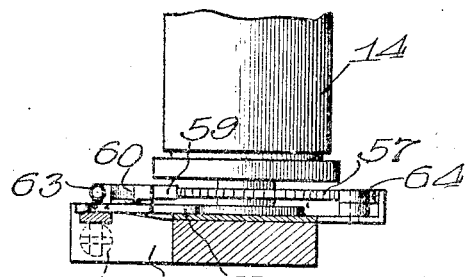
Figure 6:
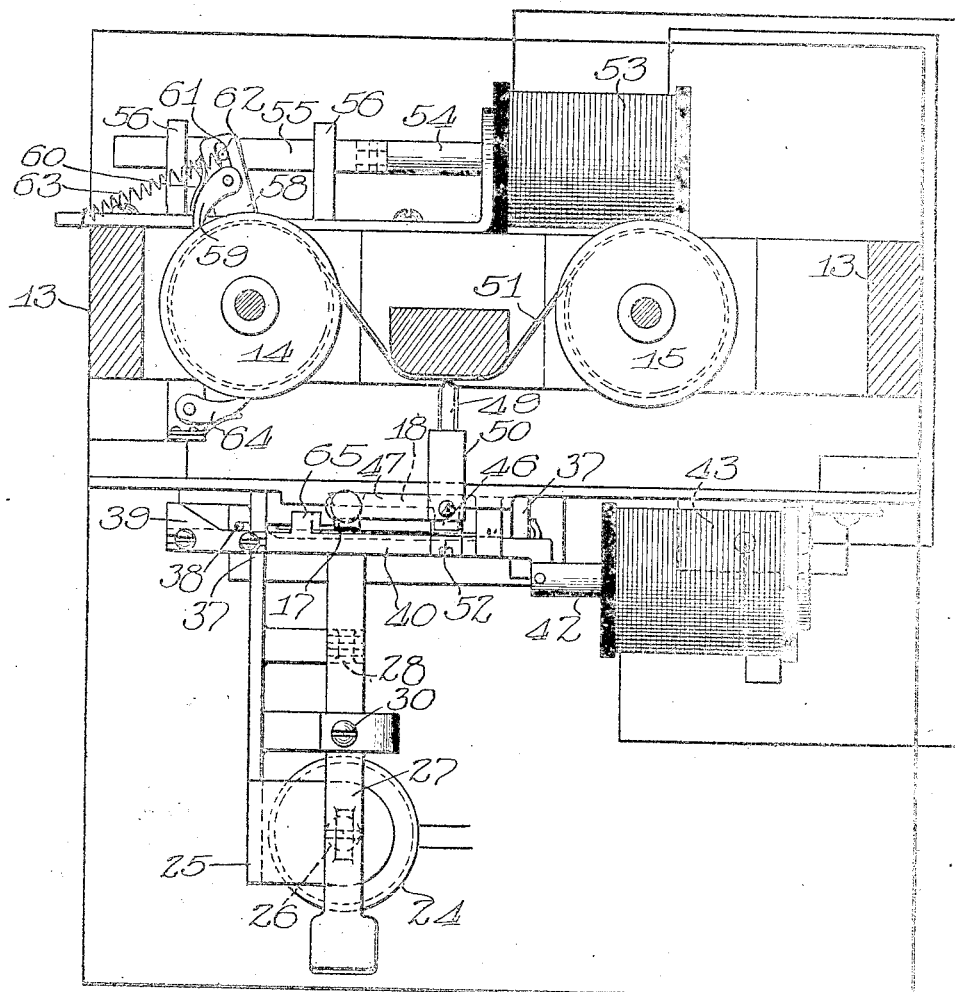
Figure 7:
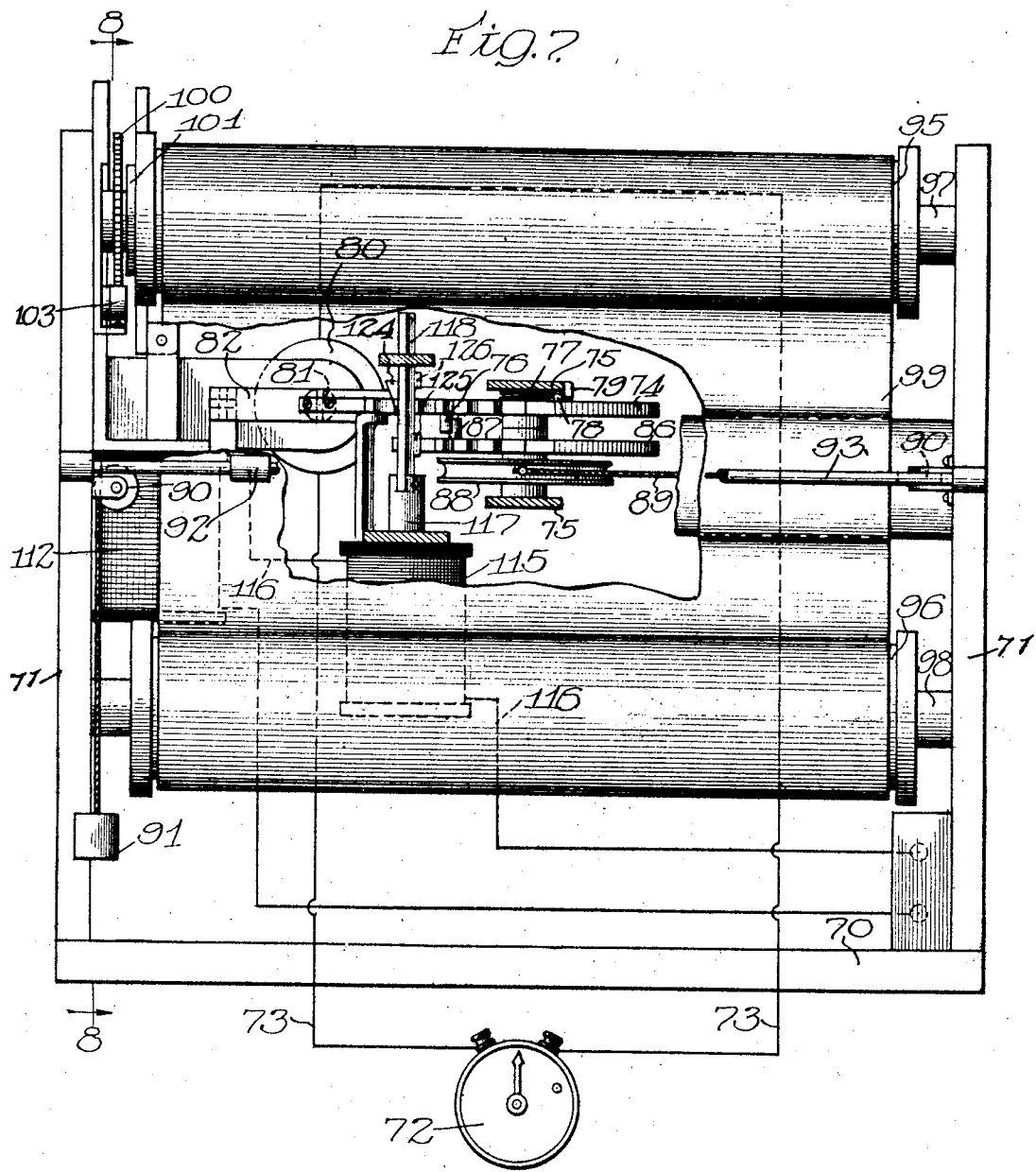
Figure 8:
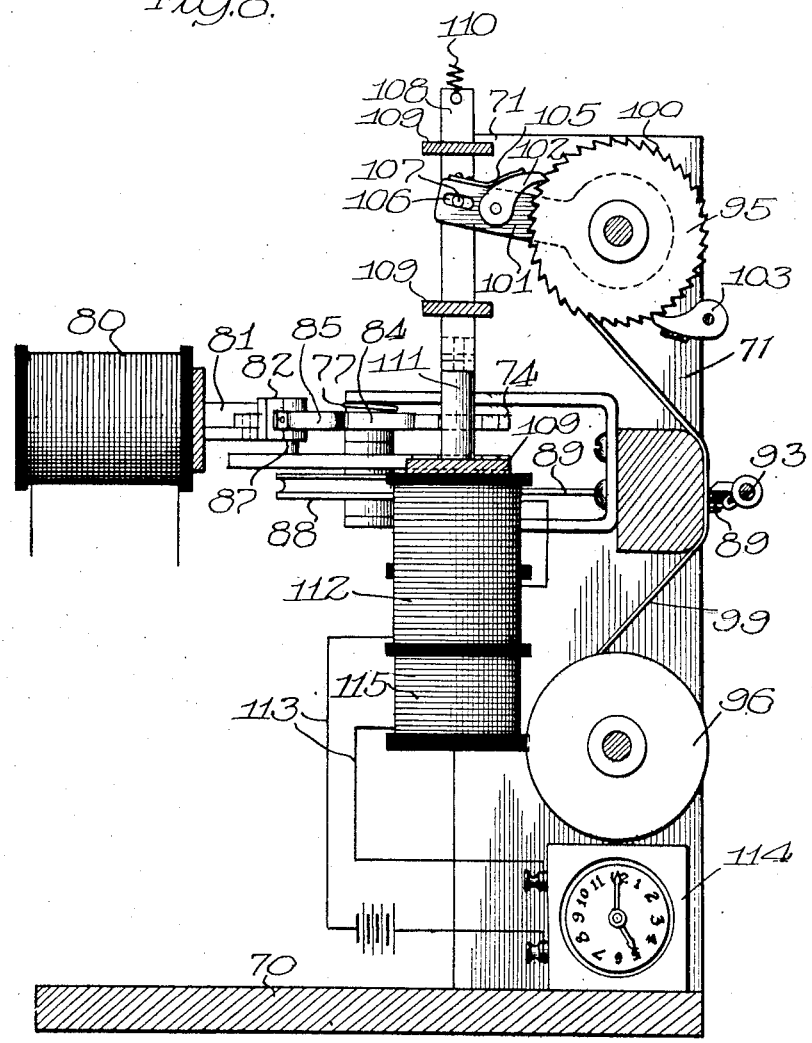
Figure 11:
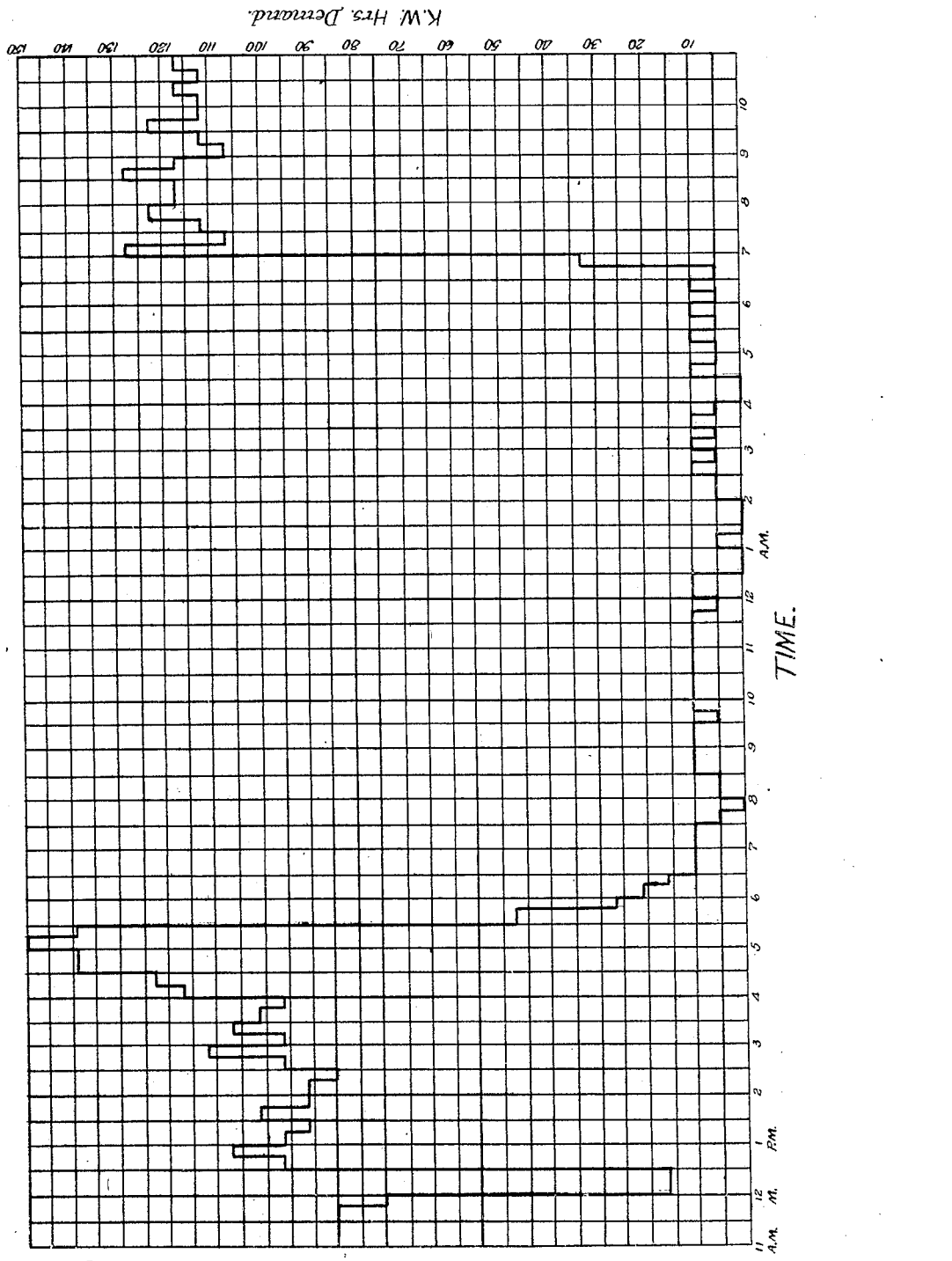

In the accompanying drawings,—Figure 1 is a front view of one form in which my invention is embodied; Fig. 2 is an end elevation of the same form shown in Fig. 1; Fig. 3 is a detail, partially in section, of the top portion of the device shown in Fig. 1; Fig. 4 is a detail, being a cross-section on line 4—4 of Fig. 2; Fig. 5 is a detail, being a section on line 5—5 of Fig. 4; Fig. 6 is a top view, being a section on line 6—6 of Fig. 1; Fig. 7 is a front elevation with the paper broken away to show the mechanism of another form in which I have embodied my invention; Fig. 8 is an end view, being a section on line 8—8 of Fig. 7; Fig. 9 is a top or plan view; Fig. 10 is a detail, being a vertical section on line 10—10 of Fig. 9; and Fig. 11 is a chart showing a typical tracing produced by my device.

Referring to the drawings,—11 indicates a controller, or positioning member, which in the embodiment of my invention shown in Figs. 1 to 6 is in the form of a base or frame.

12 indicates a plate supported upon suitable standards, as 13, from the base of the frame 11.

14—15 indicate vertical rollers journaled in suitable supports on the frame behind the plate 12 and adapted to carry a roll of paper upon which the record is traced in the manner hereinafter described. The rollers are driven in the manner hereinafter described to shift the paper at regular intervals of time.

16 indicates a support on the base or the frame 11 which is adapted to stop the downward movement of the racks hereinafter described.

17 indicates a rack, which is slidingly mounted in suitable supports, as 18, on the plate 12.

19 indicates the dial of any suitable form of watt-hour meter having an index-hand 20. By means of suitable contact mechanism in the recording train the meter is adapted at equal increments of energy measured by the meter to close the circuit through circuit wires 21—22 connected with a suitable battery or other source of direct current, as 23.

24 indicates a solenoid, which is connected to the circuit wires 21—22 and is mounted in a suitable support, as 25, on the plate 12. As the hand 20 of the index dial 19 passes around, it makes contact in the well-known way so as to complete the circuit through wires 21 and 22 and solenoid 24 so as to energize the same for very short periods at regular intervals of electric energy consumption.

26 indicates a core, which is adapted to enter the solenoid 24 and which, at its upper end, is pivoted to a lever 27 which is pivoted between its ends to a suitable support, as 28, carried by the plate 12.

29 indicates a bracket, which is supported upon the solenoid 24 and whose upper end extends out from the lever 27 and is provided with a stop 30, preferably in the form of a screw, adjustable to limit the upward movement of the lever. The lever is normally held in its upward position by means of a suitable spring, as 31, bearing against the lower end of the bracket 29 and at its upper end on the under side of the lever.

32 indicates a pawl, which is mounted upon the inner end of the lever 27 and is adapted to engage with the teeth of the rack-bar 17. Whenever the solenoid is energized, the core 26 is drawn down into it, the outer end of the lever 27 lowered, the inner end raised, and by means of the pawl 32 which engages the teeth of the rack-bar the rack-bar is raised one notch for each energizing of the solenoid. The pawl 32 is hinged to the end of the lever 27 and is provided with a projecting arm 33 which tends to keep the pawl against the rack. 34 indicates a stop, which is pivotally mounted upon a suitable support, as 35, and whose upper end is bent around horizontally so as to be normally held in yielding engagement with the teeth of the rack-bar 17, and which, until it is thrown out of position, as hereinafter described, supports the rack-bar at any given position during the operation of the pawl 32.

36 indicates a bent wire, which is pivotally supported in suitable supports, as 37, on the plate 12 and extends downward therefrom, across underneath and behind the stop 34 in such a way that when the wire is thrown outward, as described, the stop 34 is held out of engagement with the teeth of the rack-bar 17. The wire 36 has a portion 38 extending upward from one of its pivotal points and is adapted to be brought in contact with a cam 39 on a horizontal slide-bar 40 which is slidingly mounted in suitable supports in the machine, whereby, when said slide-bar is moved inward by the operation of the solenoid hereinafter described, the cam 39 forces the end 38 of the wire 36 inward, throwing its horizontal portion outward and freeing the stop 34 from the teeth of the rack-bar 17.

41 indicates a wire loop mounted on the pawl 32 and surrounding the stop 34, whereby, when the stop 34 is moved outward as above described, the pawl 32 is also carried with it out of engagement with the teeth of the rack-bar. The slide-bar 40 is connected at its other end opposite the cam to the core 42 of a solenoid 43 supported on the plate 12 and connected with circuit wires 44 from any suitable battery or source of electrical supply. The core is normally held yieldingly in its outward position in the solenoid by means of a spring 42$^a$ of suitable tension. 45 indicates a master-clock in said circuit 44 of any well-known description and adapted, by the movement of its hands at predetermined intervals in the well-known manner, to complete circuit through circuit wire 44 and solenoid 43 and to maintain said circuit closed for a very short interval of time. Whenever the solenoid 43 is thus energized at regular predetermined intervals, the core 42 is drawn inward into the solenoid, moving the slide-bar 40 horizontally inward with it, thus moving the cam into contact with the arm 38 of wire 36 so as to swing the same as above described. 46 indicates a second rack-bar, which is slidingly mounted in suitable supports, as 18, on the plate 12 so as to slide longitudinally of itself up and down therein. The rack-bar 46 is provided with an arm 47 which extends out over the upper end of rack-bar 17 in registry therewith.

49 indicates a pen stylus or equivalent device which is carried by any suitable supporting device, as 50, from the support 47 at the upper end of the rack-bar 46 and is adapted, in its movement hereinafter described, to trace a line upon the roll of paper 51 mounted on the rollers 14—15.

52 indicates a stop which is pivotally mounted upon the slide-bar 40 so as to normally engage the teeth of the rack-bar 46 but to be freed therefrom when the slide-bar 40 moves to the right in Fig. 1 under the operation of the solenoid 43 above described.

65 indicates a lug on the slide-bar 40 which is normally out of engagement with rack-bar 17 to one side thereof but which is adapted to be drawn into contact with the teeth of said rack-bar by the movement of the slide-bar which frees the stop 52 from rack 46. 53 indicates a solenoid in series with solenoid 43 and consequently controlled by the master-clock 45 and supported in any suitable way upon the frame 11.

Referring to Figs. 4 and 5, where these parts are best shown,—54 indicates a core for said solenoid 53, which is pivotally attached at its outer end to a slide-arm 55 suitably mounted in supports, as 56, mounted on the framework so as to slide therein. 57 indicates a ratchet-wheel which is rigidly secured on the shaft of the roller 14 at the bottom thereof. 58 indicates an arm, which is rotatably mounted upon the shaft of the roller 14 below the lower end of said roller and carrying a spring-seated pawl 59 the end of which is normally held in yielding engagement by a spring 60 against the teeth of the ratchet-wheel 57. The outer end of the arm 58 is connected by means of a slot 61 therein and a pin 62 with the slide-bar 55 so that when the slide-bar 55 is moved the arm 58 is swung to one side or the other. The arm is normally held in the position shown in Fig. 4 by a spiral spring 63 connected at one end to said bar and at the other end to a suitable portion of the frame. 64 indicates a spring-seated pawl pivoted on a suitable support of the frame end engaging the teeth of the ratchet 57 so as to hold the same in any position to which it has been moved by the pawl 59. The pawl 59 is adapted to slip over the teeth of the wheel 57 when the slide-bar 55 is moved inward with the core 54 and to engage the teeth and thereby give the roller 14 a suitable amount of rotation as the arm 55 is returned to its normal position by the spring 63 when the core 54 is released from the solenoid 53. The pawl 64, of course, slips over the teeth when the ratchet-wheel 57 is rotated by the action of the spring 63 and pawl 59.

The operation of the devices so far as described is as follows: The rack-bars, before they are acted upon as hereinafter described, are normally in their lowest position with their lower ends resting upon the support 16, the arm 47 in contact with the upper end of the rack-bar 17. As the current begins to pass, the indicating hand on the dial 19, passing around, makes contacts at regular intervals of energy consumption so as to complete the circuit through wires 21—22 and the solenoid 24 so as to energize the same for a brief period each time contact is made in the watt-hour meter. With each energizing of the solenoid the core is drawn down and by means of the lever 27 and pawl 32 the rack-bar 17 is lifted up one step, lifting with it the rack-bar 46. The paper is stationary and the pen therefore makes a straight upward line on the paper. At regular intervals of elapsed time, which are predetermined and may be any desired interval of time, the clock 45 makes the contact so as to close the circuit 44 and energize the solenoids 43 and 53. As soon as the solenoid 43 is energized the core 42 is drawn inward, which moves the stop 52 out of engagement with rack-bar 46 and the lug 65 into engagement with the rack-bar 17. The rack-bar 17 is thereby held in the position which it has reached at this time and rack-bar 46, if its arm 47 then rests upon the top of the rack-bar 17, also remains in position. The further movement of the slide 40 brings the cam 39 into contact with arm 38 of wire 36, swinging the same outward and freeing both the pawl 32 and stop 34 from the rack-bar 17, leaving it supported only by lug 65. The same operation of the hands of the master-clock which has energized solenoid 43 has also energized solenoid 53 in series therewith, and the core 54 is thereupon drawn inward, carrying with it slide-bar 55 and rocking the arm 58 in a clockwise direction in Fig. 4, so as to be ready for a movement of the drum upon the return of the slide-bar by the spring 63. As soon as the current is broken, which is done after a very short interval of time, the solenoid 53 is deënergized and the arm 55 returns to its normal position under the influence of spring 63 and arm 58, and the pawl 59 engaging the teeth of the ratchet-wheel 57 gives to the drum 14 a small degree of rotation, thus causing a horizontal mark of the pen upon the drum. As the circuit is broken solenoid 43 is also deënergized, causing the core 42 under the influence of spring 42$^a$ to resume its normal position. This moves the stop 52 again into engagement with rack-bar 46 so as to hold it in the same position and moves the lug 65 out of engagement with the rack-bar 17, which—the pawl 32 and stop 34 not being yet returned to their normal position—is free to drop to the bottom to its zero position. The cam is next freed from the arm 38 of wire 36 and the pawl 32 and stop 34 immediately come into engagement again with rack-bar 17 ready to repeat the operation. The meter continuing to run, the rack-bar 17 is again raised notch by notch until the next interval of time has elapsed, as indicated on the master-clock. If a less amount of energy has been consumed during this time than during the last interval of time, the top of the rack-bar 17 will not reach the arm 47 at the top of the rack-bar 46 and a space will therefore be left between them. As soon as the solenoid 43, therefore, is again energized after the same interval of time and the stop 52 is thereby disengaged from rack-bar 46, the rack-bar 46 will drop until arm 47 reaches the top of rack-bar 17 and the pen will trace a corresponding vertical line from the last horizontal line caused by the rotation of the drum to a position limited by the rising movement of the rack-bar 17. In case, however, a greater amount of energy should have been used than during the last interval, the rack-bar 17 will rise to contact with the cross-arm 47, and the upward movement continuing, will raise with it the rack-bar 46 until the time interval has again elapsed and the circuits completed through solenoids 43 and 53 as above described. In this case the vertical line will be traced upward by the pen on the roll of paper from the last horizontal line caused by the partial rotation of the roll to a point equal to the rise of the rack-bar 17 by its successive actuations during the same interval of time.

It will be understood, of course, that this operation will be repeated as long as current is being used and the chart will show a line from which the average interval demand of the user can be at once seen. A typical chart as produced by the operation of my device is shown in Fig. 11.

It will be obvious from the above description that during successive equal time intervals the pen will move up and down on the chart—that is to say, in the direction which indicates the amount of energy consumed—only when the amount of energy varies between successive time intervals, and that if the same amount of energy is used during successive time intervals the position of the pen point on the chart will not be varied except as the paper roll winds. If, therefore, at successive intervals the amount of energy consumed should be the same, the successive movements of the roller at the successive time intervals would cause the pen point to travel along the chart in a horizontal line after each interval. This is well shown in the accompanying chart, which, as has been said, has been taken from an actual trial of the instrument, and shows the line made over twelve hours' time.

I have described above one form in which my invention may be embodied and its operation. In Figs. 7, 8, 9 and 10, however, I have shown another form which, for mechanical and structural reasons, is preferable. This form, generally speaking, differs from the form above described in that instead of straight racks the racks are in the form of ratchet wheels, and consequently a number of other changes in mechanical details are made to suit that construction. Referring to those figures,—70 indicates a base and 71 the frame supported on the base. 72 indicates the dial of a meter of ordinary type to make contacts in circuit 73 so as to close the same at regular intervals of electric energy consumption as integrated by the meter. 74 indicates a ratchet-wheel having ratchet teeth on its periphery, which is journaled in suitable bearings, as 75, supported in any suitable manner on the frame. 76 indicates a pin projecting downward from the under surface of the ratchet-wheel 74, which is adapted to contact with a pin on the other ratchet-wheel hereinafter described. The ratchet-wheel 74 is normally held in the position shown in Fig. 9 by means of a suitable spiral spring 77, or in some other suitable manner, so that when moved out of position and left free to return, as hereinafter described, it will return to its original position. 78 indicates a pin on the upper surface of the ratchet-wheel 74, which is normally in position against a stop 79 suitably mounted on the frame and which stops the wheel at the point indicated when after being brought out of normal position, as hereinafter described, it is left free to return, and does return, to it. The stop 79 operates to limit the movement of the wheel and stop it in normal position in the same way that the standard 16 does in the first-described form of my device. 80 indicates a solenoid in the circuit 73, which is momentarily energized each time that the circuit is completed by the meter 72. 81 indicates a core within said solenoid, which is, of course, drawn into it every time that the solenoid is energized. The core is pivotally connected at its outer end with a lever 82 which is pivoted at one end to a suitable pivotal support, as 83, on the frame and which carries pivotally suspended at the other end a pawl 84 which is held in yielding contact with the teeth of the ratchet-wheel 74 by a suitable spring, as 85. Every time that the solenoid is energized, as more fully described hereinafter, the core 81 is drawn inward, lifting the lever 82, and thus, through the pawl 84, moving the ratchet-wheel 74 around one notch in a clockwise direction in Fig. 9. 86 indicates a ratchet-wheel, which is rotatably mounted on the shaft of the wheel 74. 87 indicates a pin, which is mounted on the upper surface of the ratchet-wheel 86 in register with the pin 76 on ratchet-wheel 74, whereby as said ratchet-wheel 74 is moved by the solenoids above described the movement through pins 76 and 87 is communicated to the ratchet-wheel 86 which is rotated thereby with the wheel 87 in the same direction and in the same amount. 88 indicates a sheave, which is rigidly secured upon the shaft of ratchet-wheel 86, or formed integral therewith. 89 indicates a cord, which is fastened at one end to the sheave 88 and passes around suitable pulleys, as 90. 91 indicates a weight attached to the end of the cord, which holds the ratchet-wheel 86 and sheave 88 normally in the position shown in Fig. 9 and tends to return them to said position when rotated therefrom and left free to be so returned. 92 indicates a carriage, which is slidingly mounted upon a rod 93 which extends across the front of the machine in front of the roll of paper hereinafter described. 94 indicates a stylus or recording pen, which is carried by the carriage 92 and adapted to bear upon the roll of paper or chart hereinafter described. 95—96 indicate rollers, which are journaled upon suitable shafts, as 97—98, respectively, in the frame work of the machine.

99 indicates a roll of paper, which is secured to the drums and is wound off one on to the other in the manner hereinafter described. The roll of paper is, of course, ruled by lines across each other at right angles into divisions which in one direction indicate watt-hours and in the other predetermined periods of time, such as is shown on the chart in Fig. 11, and in the usual manner. This ruling is not indicated on the other figures of the drawings as it is well known and would only tend to obscure the drawings. 100 indicates a ratchet-wheel, which is rigidly secured to the shaft 97 of roller 95. 101 indicates an arm, which is pivotally mounted at one end on the shaft of the drum 95 and carries pivotally mounted thereon a pawl 102 which is adapted to engage the teeth of the ratchet-wheel 100. 103 indicates a pawl, which is pivoted on the framework at a suitable point and engages the ratchet-wheel 100 upon the opposite side from the arm 101 so as to hold the wheel in any position as it is moved by the pawl 102. Both the pawls 102 and 103 are held by springs, as 104 and 105, respectively, in yielding engagement in the usual manner with the teeth of the ratchet-wheel 100. The outer end of the arm 101 is provided with a slot 106 which engages a pin 107 on a rod 108 which is slidingly mounted in suitable supports, as 109, in the framework so as to slide longitudinally of itself therein. The rod is normally held yieldingly upward by any suitable spring, as 110. The lower end of the rod 108 is connected with a core 111 of a solenoid 112 which is connected to circuit wires 113. 114 indicates a master-clock which is adapted, in the well known way at suitable intervals of time, to make contact so as to complete the circuit through the wires 113 and the solenoid 112. When the solenoid 112 is thus energized at predetermined regular intervals of time, the core 111 is pulled into the solenoid, carrying with it rod 108 against the action of the spring and swinging the arm 101 around upon its pivot, the pawl 102 sliding over the ratchet teeth of the ratchet-wheel 100, which is held in position by pawl 103. Whenever the solenoid 112 is deënergized, the rod 108 is pulled upward by the spring 110, swinging the arm 101 in a clockwise direction in Fig. 8, causing the pawl 102 to engage the teeth of ratchet-wheel 100, giving it and with it the roller 95 a clockwise rotation, thus winding up the roll of paper 99 upon roller 95 and off roller 96.

115 indicates a solenoid, which, by circuit wires 116, is connected with the master-clock 114 in series with solenoid 112 above described. 117 indicates a core for said solenoid 115, which is normally held upward by a suitable spring like that shown in the solenoid 43 in Fig. 3. 118 indicates a slide-bar slidingly mounted in suitable supports on the frame and connected at its inner end with the outer end of the core 117 whereby, when said core is drawn into the solenoid 115 by the energizing of said solenoid, or when said core is pushed out by the action of the spring when said solenoid is deënergized, the bar 118 is reciprocated in one direction or the other. 119 indicates a dog or stop which is pivotally mounted in a suitable support, as 120, and is held by a suitable spring, as 121, in yielding engagement with the teeth of ratchet-wheel 74. The pawl 84 is provided with a lug 122, which, by means of a link 123, is connected with the dog 119, whereby, when said dog 119 is swung out from engagement with the ratchet-wheel 74, it carries with it the pawl 84 out of engagement with the ratchet-wheel. 124 indicates a cam on the slide-bar 118, which is adapted, when said slide-bar is moved down by the drawing down of the core 117, to be brought into contact with the under side of said dog 119 and swing the same away from the ratchet-wheel 74, swinging with it the pawl 84. 125 indicates a latch on slide-bar 118, which is normally in yielding engagement with the teeth of the ratchet-wheel 86 so as to permit the teeth of the same to slip over it when rotated in a clockwise direction in Fig. 9 and to hold it against backward rotation when the latch is in place. 126 indicates a latch, which is normally out of engagement with the teeth of the ratchet-wheel 74 but which is adapted to be brought in engagement with the same by the downward movement of the slide-rod 118 so as to hold the said ratchet-wheel, while said latch is in engagement therewith, against backward rotation.

The operation of the parts above described is as follows: The position of the parts shown in Fig. 9 is the position in which the parts are when the hand on the meter is at zero. When the current begins to pass, the hand of the dial is, of course, turned therewith in accordance with the rate of the current flow, and as the meter makes the contact through circuit 73 at regular intervals of energy expended, the solenoid 80 is momentarily energized, the core 81 pulled inward, the lever 82 carried therewith, and, by means of the pawl 84, the ratchet-wheel 74 is moved around one notch, which motion is communicated by the pins 76 and 87 to the ratchet-wheel 79 and sheave 88, which, of course, are thereby correspondingly rotated in the same direction. This winds up the cord 89 against the action of the weight and carries the carriage 92 and pen 94 to the right in Fig. 1, inscribing a straight line along the surface of the paper. This movement continues step by step until the hand of the clock has passed over the predetermined interval of time. As the hand reaches this predetermined interval, the circuits through wires 113 and 116 are closed and solenoids 112 and 115 energized. The energizing of solenoid 115 pulls down the core 117, carrying with it the slide-rod 118, thus freeing latch 125 from wheel 86 but pulling latch 126 into engagement with ratchet-wheel 74. The wheel 86 is, therefore, prevented from returning to its normal position because wheel 74 is held in position by the latch 126 and because the pins 76 and 87 are in contact. As the downward movement of the rod 118 reaches nearly its innermost position, the cam 124 coming in contact with dog 119 rocks the same out of engagement with the teeth of the ratchet-wheel 76, carrying the pawl 84 also out of engagement with the ratchet-wheel 74. As soon as the hands of the clock pass off the contact and the circuit through circuit wires 113 and 116 is broken, solenoids 112 and 115 are deënergized. The deënergizing of solenoid 112 allows the spring 110 to pull the rod 108 and core 111 upward into their original position, rocking the arm 101 in a clockwise movement, causing pawl 102 to make a partial rotation of roller 95, giving the paper a short forward movement which causes the pen to make a short line at right angles to the original line which indicated energy consumed. The deënergizing of solenoid 115 causes the core 117 to be projected upward by the action of the spring similar to that shown in solenoid 43, which brings latch 125 again into engagement with ratchet-wheel 86, holding it in this position. At the same time latch 126 is moved out of engagement with ratchet-wheel 74, which is thereupon at once returned to its original zero position with the pin 78 against stop 79 by the action of the spring 77, the dog 119 and pawl 84 being still held out of position by the cam 124. As the cam moves upward it is freed from engagement with the dog 119, causing it and pawl 84 to be again brought into engagement with the ratchet-wheel 74. The movement above described is thereupon repeated as long as the current continues to run.

As with the first form of my apparatus described, if during the next time interval, the amount of energy used is less than what was used in the last preceding interval, the pin 76 will not be brought into contact with pin 87 because of the lesser amount of rotation of ratchet-wheel 74 and because ratchet-wheel 86 has been held in its original position, as above described. Upon the energizing, therefore, of the solenoid 115 to move the bar inward as before, upon the expiration of the next time interval, the freeing of the latch 125 from the wheel 86 will leave it free to rotate, and under the action of the weight it will rotate in a contraclockwise direction in Fig. 9 until the pin 87 comes in contact with pin 76, causing the pen to make a straight line along the stationary paper parallel with the mark made by the first outward movement so as to indicate the difference in energy used during the two periods. In case, however, the energy used during any period should be greater than the energy used during the last preceding period, the ratchet-wheel 74 will be given a greater amount of rotation and the ratchet 86 will be moved farther around in a clockwise direction, carrying the pen still farther outward along the sheet in a line parallel with the first line and longer than the first line by an amount proportionate to the greater amount of energy used. At the end of each predetermined period of time the operation above described is repeated. If the amount of energy in any period should exactly equal that used during the preceding period, the ratchet-wheel 74 will be rotated exactly the same amount as in the previous period and the pin 76 will just be brought into contact with the pin 87, and the movement of the paper by the rotation of the roll will cause simply a continuation of the straight line at right angles with the line indicating the amount of energy consumed, whereby both the amount of energy used and the duration of time are indicated. Precisely the same chart would be made under similar circumstances by the apparatus shown in Figs. 7 to 10 as that above referred to, which was produced by an apparatus like that first above described, the only difference being that in one case the paper moves in a vertical and the other in a horizontal plane.

In addition to the forms shown, my invention may be embodied in various other ways, and the claims hereinafter made are, therefore, to be construed accordingly.

That which I claim as my invention, and desire to secure by Letters Patent, is,—

1. A graphic recording instrument, comprising means for intermittently moving a chart at predetermined time intervals, a stylus operating on said chart and movable transversely thereof, and electrically-operated means adapted to positively move said stylus in one direction and controlling its range of movement in the opposite direction.

2. A graphic recording instrument, comprising means for intermittently moving a chart at predetermined time intervals, a stylus operating on said chart and movable transversely thereof, and intermittently-acting electrically-operated means adapted to positively move said stylus in one direction and controlling its range of movement in the opposite direction.

3. A graphic recording instrument, comprising means for intermittently moving a chart at predetermined time intervals, a stylus operating on said chart and movable transversely thereof, retaining means for holding said stylus against reverse movement while the chart is in motion and acting to release the stylus after the chart stops, and electrically-operated means adapted to positively move said stylus in one direction and controlling its range of movement in the opposite direction.

4. A graphic recording instrument, comprising electrically-operated means for intermittently moving a chart at predetermined time intervals, a stylus operating on said chart and moving transversely thereof, means controlled by said chart moving means for retaining said stylus in a fixed position while the chart is in motion, and electrically-operated means adapted to positively move said stylus in one direction and controlling its range of movement in the opposite direction.

5. A graphic recording instrument, comprising means for intermittently moving a chart at predetermined time intervals, a stylus operating on said chart and movable transversely thereof, means controlled by said chart-moving means for retaining said stylus in a fixed position while the chart is in motion, and intermittently-acting electrically-operated means adapted to positively move said stylus in one direction and controlling its range of movement in the opposite direction.

6. A graphic recording instrument, comprising means for moving a chart at predetermined time intervals, a stylus operating on said chart and movable transversely thereof, retaining means controlled by said chart-moving means for holding said stylus against reverse movement while the chart is in motion and acting to release the stylus after the chart stops, and electrically-operated means adapted to positively move said stylus in one direction and controlling its range of movement in the opposite direction.

7. A graphic recording instrument, comprising electrically-operated means for intermittently moving a chart at predetermined time intervals, a stylus operating on said chart and moving transversely thereof, means controlled by said chart-moving means for retaining said stylus in a fixed position while the chart is in motion, and intermittently-acting electrically-operated means adapted to positively move said stylus in one direction and controlling its range of movement in the opposite direction.

8. A graphic recording instrument, comprising electrically-operated means for intermittently moving a chart at predetermined time intervals, a stylus operating on said chart and moving transversely thereof, means controlled by said chart-moving means for retaining said stylus in a fixed position while the chart is in motion, and intermittently-acting electrically-operated means adapted to positively move said stylus in one direction and controlling its range of movement in the opposite direction, said stylus retaining means being adapted to release the stylus after the chart stops.

9. A graphic recording instrument, comprising means for intermittently moving a chart at predetermined time intervals, a stylus operating on said chart and movable transversely thereof, intermittently-operated means for moving said stylus in one direction and controlling its range of movement in the opposite direction, and an electric meter adapted to actuate said stylus-moving means in one direction.

10. A graphic recording instrument, comprising means for intermittently moving a chart at predetermined time intervals, a stylus operating on said chart and movable transversely thereof, intermittently-operated means for moving said stylus in one direction and controlling its range of movement in the opposite direction, and an electric meter adapted to actuate said stylus-moving means in one direction, said stylus-moving means being adapted to return to its initial position at the beginning of each of said time intervals.

11. A graphic recording instrument, comprising means for intermittently moving a chart at predetermined time intervals, a stylus operating on said chart and movable transversely thereof, intermittently-operated means for moving said stylus in one direction and controlling its range of movement in the opposite direction, an electric meter adapted to actuate said stylus-moving means in one direction, and means controlled by said chart-moving means for retaining said stylus in a fixed position while the chart is in motion.

12. A graphic recording instrument, comprising means for intermittently moving a chart at predetermined time intervals, a stylus operating on said chart and movable transversely thereof, an electric meter, and means actuated by the operation of said meter to positively move said stylus in one direction and to limit its range of movement in the opposite direction.

13. A graphic recording instrument, comprising means for intermittently moving a chart at predetermined time intervals, a stylus operating on said chart and movable transversely thereof, an electric meter, and a controlling member adapted to be advanced from its initial position during each of said time intervals to an extent corresponding with the energy consumption during such interval as indicated by said meter and then to return to its initial position, and means for retaining said stylus during each period of movement of the chart in a position corresponding to that occupied by said controlling member at the end of the preceding time interval.

14. A graphic recording instrument, comprising means for intermittently moving a chart at predetermined time intervals, a stylus operating on said chart and movable transversely thereof, and electrically-operated means adapted to positively move said stylus in one direction while the chart is stationary and controlling its range of movement in the opposite direction.

15. In combination, a moving element, electrically actuated mechanism adapted to give to said moving element a step by step movement for equal increments of electric energy consumed, a second moving element adapted to be engaged by said first moving element and moved therewith, mechanism adapted to permit the automatic return of said moving elements toward normal position at the end of predetermined intervals of time, chart-carrying mechanism adapted to hold a chart, intermittently acting mechanism adapted at said predetermined intervals of time to actuate said chart-carrying mechanism to move said chart intermittently, and a stylus in operative connection with said second moving element and adapted to move transversely of and bear upon said chart.

16. In combination, a moving element adapted to automatically return to normal position when free to move, electrically actuated mechanism adapted to give to said moving element a step by step movement out of normal position for equal increments of expended electrical energy, a second moving element adapted to be engaged by said first moving element and moved therewith, and tending to automatically return toward normal position when free to so return, a stylus operatively connected with said second moving element, chart-holding mechanism, mechanism adapted at the end of predetermined intervals of time to alternately engage and disengage said first moving element and to alternately disengage and engage said second moving element and hold the same in position until the end of the next predetermined interval of time, and intermittently acting mechanism adapted at said predetermined intervals of time to operate said chart-holding mechanism to give said chart a limited intermittent movement in a direction across the line of movement of the stylus.

17. In combination, an electric circuit, an electricity meter adapted to close said circuit for equal increments of expended electrical energy, a moving device adapted to automatically return to normal position when left free to do so, electrical actuating mechanism in said circuit adapted to give said moving device a step by step movement for said equal increments of expended electrical energy, a second moving device tending to automatically return toward normal position when free to do so and adapted to be engaged by said first moving device and moved therewith, mechanism adapted at the end of predetermined intervals of time to engage said first moving device, temporarily hold it in its position, and then free the same from engagement, mechanism normally in engagement with said second moving device and adapted at said predetermined intervals of time to disengage and then reëngage said second moving device and retain it during the next time interval, chart-holding mechanism adapted to hold a chart, intermittently acting mechanism adapted at said predetermined intervals of time to operate said chart-holding mechanism to give said chart a limited intermittent movement, and a stylus operatively connected to said second moving device and adapted to move transversely of and bear upon a chart carried by said chart-holding mechanism.

18. An electric circuit, an electricity meter adapted to intermittently close said circuit for equal increments of expended electric energy, a moving element adapted normally to automatically return to zero position when moved out of the same, means adapted to give to said moving element a step by step movement with each closing of said circuit, a second moving element adapted to be engaged by said first moving element and move therewith and adapted to automatically return toward normal position after being moved out of the same and when free to move, mechanism adapted at the end of regular predetermined time intervals to first free said second moving element and engage said first moving element and then engage and retain said second moving element during the next time interval and free said first moving element, chart-holding mechanism, intermittently acting means for giving said chart-holding mechanism a movement to move the chart held thereby intermittently at predetermined time intervals, and a stylus operatively connected with said second moving element and adapted to move transversely of and inscribe said chart.

19. In combination, a positioning-member, mechanism adapted to give to said positioning-member a movement for equal increments of electrical energy consumed, an engaging device adapted to be brought into engagement with said positioning-member, mechanism adapted at the end of predetermined intervals of time to move said engaging device temporarily into and then out of engagement with said positioning-member, a stylus-carrying member adapted to be moved by said positioning-member, chart-carrying mechanism, an engaging device adapted normally to engage said stylus-carrying member and when so engaged hold it in position, mechanism adapted at the end of each of said predetermined intervals of time to first temporarily free said engaging member from said stylus-carrying member and then reëngage the same, and intermittently acting mechanism adapted at said predetermined intervals of time to move said chart-carrying mechanism intermittently.

20. In combination, an electrical circuit, a meter connected with said circuit and adapted to close the same intermittently at predetermined increments of electrical energy consumed, a moving member adapted, when free to move, to rest normally in zero position, means operated by the closing of said circuit to give said moving member a step-by-step movement, an engaging device normally out of engagement with said moving member, means for moving said engaging device at the end of predetermined intervals of time temporarily into engagement and then out of engagement with said moving device, a stylus-carrying member having a device adapted to be engaged by said moving member whereby said stylus-carrying member may be moved by said moving member, an engaging device normally in engagement with said stylus-carrying member, mechanism operated at the end of said predetermined intervals of time to temporarily free said engaging device from said stylus-carrying member and then cause it to engage the same, chart-carrying mechanism, and intermittently acting mechanism adapted at said predetermined intervals of time to cause said chart-carrying mechanism to move the chart carried thereby intermittently.

21. In combination, a moving member adapted when free to rest in zero position, electric mechanism adapted at predetermined increments of electrical energy to give said moving member a step-by-step motion, a stop normally out of engagement with said moving member, mechanism adapted at the end of predetermined intervals of time to move said stop first into temporary engagement with said moving member and then out of engagement with the same, chart-carrying mechanism, a stylus-carrying member provided with a pen adapted to bear on the chart, a device on said stylus-carrying member adapted to be engaged by said first member whereby said stylus-carrying member may be moved with the step-by-step actuation of said first member, a stop device normally in engagement with said stylus-carrying member, mechanism adapted at the end of said predetermined intervals of time to first move said stop temporarily out of engagement with said stylus-carrying member and then into engagement with it again, and intermittently acting mechanism adapted at said predetermined intervals of time to operate said chart-carrying mechanism to move said chart intermittently.

22. In combination, a moving member adapted when free to rest in zero position, electric mechanism adapted at predetermined increments of electrical energy to give said moving member a step-by-step motion, a stop normally out of engagement with said moving member, mechanism adapted at the end of predetermined intervals of time to move said stop first into temporary engagement with said moving member and then out of engagement with the same, chart-carrying mechanism, a stylus-carrying member provided with a pen adapted to bear on the chart, a device on said stylus-carrying member adapted to be engaged by said first member whereby said stylus-carrying member may be moved with the step-by-step actuation of said first member, means for normally bringing said device on said stylus-carrying member into engagement with said moving member when said stylus-carrying member is free to move, a stop device normally in engagement with said stylus-carrying member, mechanism adapted at the end of said predetermined intervals of time to first move said stop temporarily out of engagement with said stylus-carrying member and then into engagement with it again, and intermittently acting mechanism adapted at said predetermined intervals of time to operate said chart-carrying mechanism to move said chart intermittently.

JACOB W. BARD.

Witnesses:
T. A. SCHLINK,
JAMES P. MURPHY.